Figure 1:
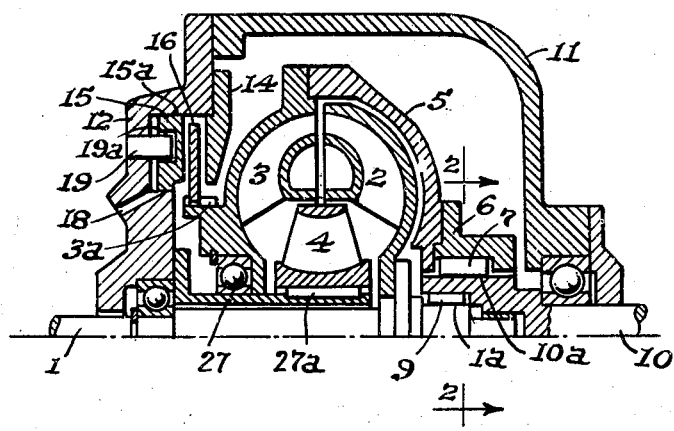

Nov. 4, 1958     A. G. SCHNEIDER     2,858,675

HYDRAULIC TURBO DRIVE AND BRAKE

Filed Jan. 17, 1956

Inventor
Adolf G. Schneider
Atty

United States Patent Office 2,858,675
Patented Nov. 4, 1958

2,858,675

HYDRAULIC TURBO DRIVE AND BRAKE

Adolf G. Schneider, Muncie, Ind., assignor to Schneider Brothers Company, Muncie, Ind., a copartnership Application January 17, 1956, Serial No. 559,734

7 Claims. (Cl. 60—54)

This invention relates to a hydraulic turbo brake in combination with a hydraulic turbo drive of the torque converter or the coupling type, using the turbo drive members for braking.

The principal object of my invention is to provide improved hydraulic braking for general use with hydraulic turbo drives and, in particular, for automotive vehicles, to provide good braking at all times but especially when going down hill. At present, the driver of a turbo-driven vehicle descending a hill has to shift to a lower gear ratio if the engine is to be used for braking, but in order to accomplish the shift, the vehicle first has to be slowed down and afterwards the engine may have to be speeded up to an unusually high speed because of the low gear, thus using up an excessive amount of gasoline and subjecting the engine to too much wear and tear.

According to my invention, a friction brake is provided for holding stationary the turbine member or members of the hydraulic turbo drive. A first one-way clutch is provided between the turbine member and output shaft which makes it possible to hold the turbine member stationary but allow the output shaft to turn freely in the driving direction. A second one-way clutch is provided between the output shaft and the input shaft, the latter carrying the pump impeller of the turbo drive. This second clutch freewheels when the input shaft turns faster than the output shaft, but is arranged to engage when the output shaft turns faster than the input shaft, whereupon both shafts turn together at the same speed.

Normal driving by the turbo drive is from the input shaft, pump impeller to turbine member, and thence through the first one-way clutch to the output shaft, while the second one-way clutch arranged between the input shaft and the output shaft is freewheeling. Hydraulic braking with the turbo drive elements is accomplished by engaging a friction brake or a brake band, holding the turbine member stationary, whereupon, the output shaft turning, driven by the gear train of the forwardly moving vehicle, causes the first one-way clutch to overrun so that the second one-way clutch engages and turns the input shaft and pump impeller, including the engine, at output shaft speed.

The hydraulic braking capacity is the same as the turbo drive input capacity, if the output shaft is stalled, which is equivalent to having the engine or other prime mover turning the pump impeller at full power available while the turbine member is stationary and the vehicle is not yet moving.

In other words, by simply adding a friction brake and two one-way clutches as herein disclosed, the torque converter or hydraulic coupling can be converted into a hydraulic brake with a braking capacity equal to the stall speed capacity of the turbo drive.

The same fluid circulation system, including cooling system, can be used during braking as with a standard torque converter, no emptying or filling of the hydraulic brakes being necessary, because the torque converter is always full of fluid.

The invention is illustrated in the accompanying drawing, in which—

Figure 2:
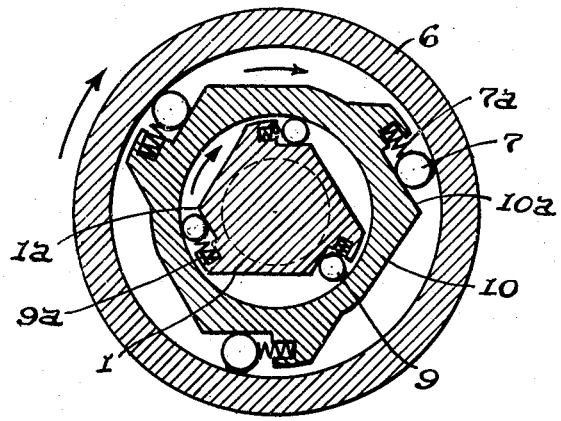

Fig. 1 is an illustration of a simple three-element torque converter showing the friction brake and the two one-way clutches for braking, provided in accordance with my invention, and Fig. 2 is a cross-section taken on line 2—2 of Fig. 1 showing both one-way clutches, one inside the other.

The same reference numerals are applied to corresponding parts in these two views.

Referring to the drawing, input shaft 1 carries the pump impeller 2 of a torque converter, the turbine member 3 and converter cover 5 of which are bolted together by their outer flanges. The first one-way clutch outer member 6 is attached by a flange to the cover 5. Output shaft 10 has integral cams 10a provided thereon, with which are engaged one-way clutch rollers 7, which are spring-loaded as appears at 7a in Fig. 2 and are inserted between outer member 6 and cams 10a. Turbine member 3 has an integral splined portion 3a which is drivingly connected with friction disc 16. Converter housing 11 has a front cover 12 bolted thereon, and a pressure plate 14 is bolted to the inner side of the front cover 12. In this cover 12 a ring piston 15 is slidable back and forth in an annular chamber 15a to which oil under pressure may be supplied through inlet hole 18, so that the ring piston 15 will move towards the friction disc 16 and clamp the disc 16 between piston 15 and pressure plate 14, holding turbine member 3 stationary. Pins 19 are pressed in cover 12 and fit freely in holes 19a in the piston 15, holding it against turning, while allowing it to slide axially.

Input shaft 1 has integral cams 1a provided thereon on which one-way clutch rollers 9 under pressure of springs 9a drivingly engage when output shaft 10 revolves faster than input shaft 1. Input shaft 1 with integral cams 1a and spring-loaded one-way clutch rollers 9 are shown in Fig. 2 in the center. The recessed end of output shaft 10 with integral cams 10a and spring loaded one-way clutch rollers 7 for the outer one-way clutch are shown surrounding the inner one-way clutch. Outer one-way clutch member 6 is shown surrounding the larger outer one-way clutch.

In operation, normal drive is through input shaft 1 and pump impeller 2 from an engine or other prime mover. Turbine number 3 receives hydraulic energy from the impeller 2 and transmits power to cover 5 and thence through one-way clutch outer member 6 and one-way clutch rollers 7 to output shaft 10. When hydraulic braking is required, oil pressure is applied through inlet hole 18 to ring piston 15, moving the latter axially to the right and clamping friction disc 16 between piston 15 and pressure plate 14, holding turbine member 3 stationary. Then, the output shaft 10 is rotating relative to cover 5 and one-way clutch outer member 6 and the one-way clutch rollers 7 are disengaged and loose. If the engine is idling and the output shaft 10 runs faster than the input shaft 1, one-way clutch rollers 9 engage, so that the output shaft 10, which turns at a speed proportional to vehicle speed, drives the input shaft 1 and pump impeller 2 and also the engine crankshaft, so that the engine serves as a brake and adds to the braking capacity of the turbo-brake. The pump impeller 2 now pumps the fluid into the turbine member 3, which is held stationary by brake disc 16 and absorbs the whole hydraulic energy supplied by the pump impeller 2, converting the torque converter (or hydraulic coupling) into a turbo-brake. When brake disc 16 is disengaged, the drive through the torque converter returns to normal. In other words, to brake hydraulically, it is only necessary to engage brake disc 16; no other controls or functions are necessary.

The design and operation of the invention has been disclosed herein as applied to a hydraulic torque converter. However, taking out the reactor 4 (which is carried on the fixed sleeve 27 and has the usual one-way clutch action, as seen at 27a, to allow it to turn freely with the parts 2 and 3 when they both run at engine speed) the torque converter becomes a hydraulic coupling, and the remainder of the design, referring to the hydraulic turbo drive and the turbo-brake, as well as its operation, remains the same.

It is believed the foregoing description conveys a good understanding of the objects and advantages of my invention. The appended claims have been drawn to cover all legitimate modifications and adaptations.

I claim:

1. A hydraulic turbo drive and brake comprising, in combination, an input shaft, an output shaft, a hydraulic turbo-drive of the closed toroidal circuit type between said shafts and comprising an impeller turning with the input shaft, and a turbine member associated therewith turning in the same direction as the impeller, separate means for connecting the output shaft with the turbine member for fluid drive or connecting the output shaft with the input shaft during braking so that the output shaft drives the impeller, and means for holding said turbine member substantially stationary during braking, whereby the same functions as a hydraulic turbo brake in the rotation of the impeller relative to it.

2. A hydraulic turbo drive and brake as set forth in claim 1 wherein the means for connecting the output shaft with the turbine member for fluid drive or with the input shaft during braking comprises two one-way clutches, the first of which is arranged so that the turbine member may be held stationary while allowing the output shaft to turn freely in the driving direction and engages when the turbine member tends to turn faster than the output shaft, and the second of which is arranged to freewheel when the input shaft turns faster than the output shaft but is arranged to be engaged when the output shaft tends to turn faster than the input shaft.

3. A hydraulic turbo drive and brake as set forth in claim 1 wherein the last mentioned holding means comprises frictionally engageable members, one of which is stationary and the other of which is fixed to the turbine member.

4. A hydraulic turbo drive and brake as set forth in claim 1 wherein the input shaft is in an automotive vehicle driven by an engine, whereby the total braking power of the vehicle equals the sum of the stalling capacity of the turbo-drive and the power required to turn the idling engine at output shaft speed.

5. A hydraulic turbo drive and brake comprising in combination, a housing, coaxially aligned input and output shafts therein, a hydraulic closed circuit type turbo-drive in said housing comprising a rotary casing carrying a turbine member, and an impeller operating inside said casing in operative relationship to said turbine member, a brake disk turning with said rotary casing, means on said housing for frictionally engaging said disk to hold said casing substantially stationary, and separate means for connecting the output shaft with the turbine member for fluid drive or with the input shaft to drive the latter during braking.

6. A hydraulic turbo drive and brake as set forth in claim 5 wherein the last mentioned means comprises two one-way clutches, the first of which is arranged so that the turbine member may be held stationary while allowing the output shaft to turn freely in the driving direction and engages when the turbine member tends to turn faster than the output shaft, and the second of which is arranged to freewheel when the input shaft turns faster than the output shaft but is arranged to be engaged when the output shaft tends to turn faster than the input shaft.

7. A hydraulic turbo drive and brake as set forth in claim 5 wherein the last mentioned means comprises two one-way clutches, the first of which is arranged so that the turbine member may be held stationary while allowing the output shaft to turn freely in the driving direction and engages when the turbine member tends to turn faster than the output shaft, and the second of which is arranged to freewheel when the input shaft turns faster than the output shaft but is arranged to be engaged when the output shaft tends to turn faster than the input shaft, the two clutches being arranged in concentric relationship and comprising a one-way clutch cam on the input shaft working inside a sleeve portion on the output shaft, the outside of which sleeve defines a one-way clutch cam working inside a sleeve turning with the rotary casing, each of said cams cooperating with rolling elements to complete the two one-way clutches.

References Cited in the file of this patent

UNITED STATES PATENTS

| | | |
|---|---|---|
| 1,953,458 | Bauer et al. | Apr. 3, 1934 |
| 2,176,105 | Schneider | Oct. 17, 1939 |
| 2,457,692 | La Brie | Dec. 28, 1948 |